No. 817,476. PATENTED APR. 10, 1906.
H. ELSNER.
COOKING UTENSIL.
APPLICATION FILED APR. 4, 1905.

WITNESSES:
INVENTOR
Hermann Elsner
BY
Fischer & Sanders
ATTORNEYS

UNITED STATES PATENT OFFICE.

HERMANN ELSNER, OF IRVINGTON, NEW JERSEY.

COOKING UTENSIL.

No. 817,476.  Specification of Letters Patent.  Patented April 10, 1906.

Application filed April 4, 1905. Serial No. 253,777.

*To all whom it may concern:*

Be it known that I, HERMANN ELSNER, a subject of the German Emperor, residing at Irvington, in the county of Essex and State of New Jersey, have invented certain new and useful Improvements in Cooking Utensils; and I do hereby declare the following to be a full, clear, and exact description of the invention, such as will enable others skilled in the art to which it appertains to make and use the same, reference being had to the accompanying drawings and to the letters of reference marked thereon.

My invention relates to improvements in cooking utensils; and the object of the invention is to provide a device consisting, essentially, of two vessels, one designed to fit within the other, the outer one provided with means designed to engage with and firmly grip and hold the inner vessel in an elevated or raised position in order to properly drain or strain such articles as are usually placed in a device of the character described.

The invention is illustrated in the accompanying drawings, in which like letters of reference indicate like parts, and in which—

Figure 1:
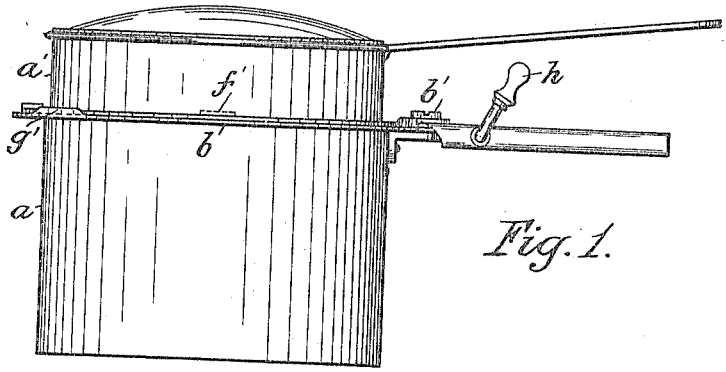
Figure 2:
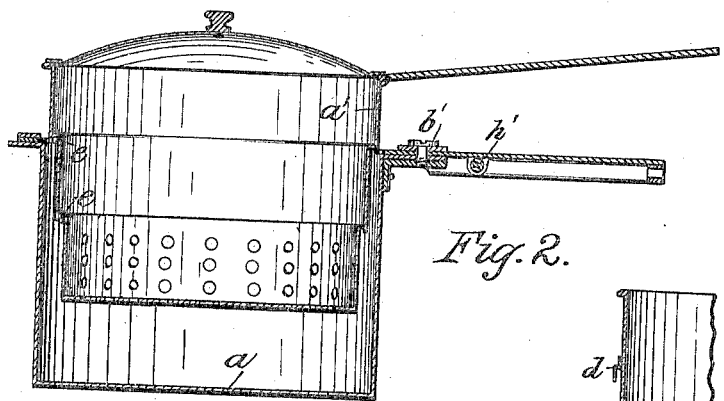
Figure 3:
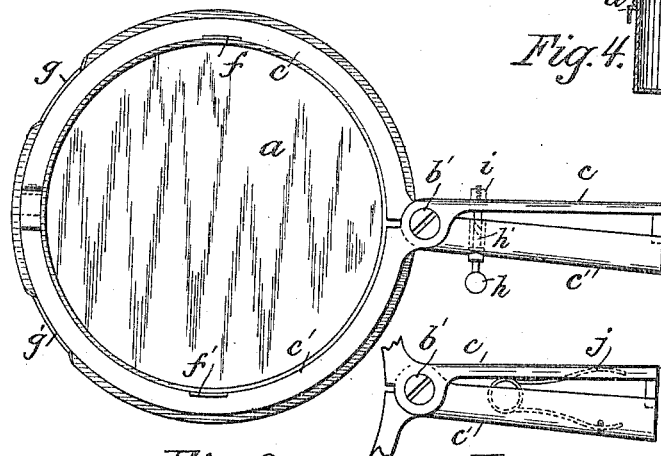

Figure 1 represents a side elevation of my improved device. Fig. 2 represents a vertical section of the same. Fig. 3 represents a plan view of the outer member, and Figs. 4 and 5 represent fragmentary views of modified forms of the inner vessel of the gripping device.

In the drawings the device illustrated consists, essentially, of two vessels, (lettered, respectively, $a$ and $a'$.) The outer vessel $a$ is provided at its upper edge with a flange $b$, upon which is pivoted, by means of a stud $b'$, a gripping device (lettered $c$ and $c'$) the outer extremities of which form the handle of the device.

Figure 4:
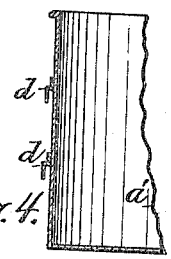
Figure 5:
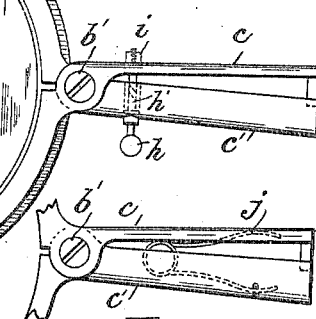

The inner vessel $a$ may consist of a cylindrical body of uniform diameter provided with rings $d$, secured thereto in any well-known manner, as shown in the modification illustrated in Fig. 4, or of a cylindrical body of varying diameters provided with circular grooves $e$, as shown in Fig. 2. The rings $d$ and circular grooves $e$ are formed on the vessel $a'$ for the purpose of engaging with projections $f$ and $f'$ on the gripping device to firmly hold in any of the desired positions the vessel $a'$ in relation to the vessel $a$. The bottom and entire cylindrical surface of the vessel $a'$ may be perforated or so much of it as may be desirable.

The flange $b$, formed on the upper extremity of the vessel $a$, is turned up at two points on its periphery, which form convenient stops $g$ and $g'$ and which serve the purpose of limiting the movement of the gripping members $c$ and $c'$ when the same are separated in order to permit the vessel $a'$ to be placed in its lowest position.

The means illustrated in Fig. 3 for separating the gripping members consists of a handle $h$, provided with a spirally-grooved shaft $h'$, which passes through both of the gripping members $c$ and $c'$ and held in position by a nut $i$.

The means illustrated in the modification shown in Fig. 5 for separating the members of the gripping device consists of a spring $j$ of any convenient form and interposed between the said members. The extreme end of the member $c'$ is provided with an offset or raised portion designed to overlap the extreme end of the gripping member $c$ and also which serves to form a stop for said extreme ends of the gripping members when the same are brought together when it is desired to firmly grip and hold in any desired position the inner vessel $a'$.

It will be understood that the construction and parts above shown are given only to illustrate the practical embodiment of my invention, and I wish it to be particularly understood that I do not limit myself to the precise details of construction hereinbefore described nor to the materials mentioned and illustrated in the accompanying drawings; but I hold myself at liberty to make such changes and alterations as naturally fall within the spirit and scope of my invention.

Having thus described my invention, what I claim is—

1. A cooking utensil comprising outer and inner vessels, a pair of semicircular gripping members pivoted together and pivotally secured to the outer vessel at its upper edge for supporting the inner vessel from the upper edge of the outer vessel at varying heights, stops arranged on the upper edge of the outer vessel to limit the outward movement of the gripping members and means for separating said gripping members.

2. A cooking utensil comprising an outer vessel provided with a flange at its upper edge, two semicircular gripping members pivoted together, and pivotally secured to and resting on said flange, means for opening and means for closing said gripping members, and an inner vessel having offsets upon its sides for direct engagement with said gripping members when closed.

3. A cooking utensil, comprising an outer vessel provided with a flange at its upper edge, a gripping device pivotally secured to said vessel at its upper edge said gripping device consisting of two semicircular members, pivoted together and resting upon said flange, an inner vessel provided with offsets upon its sides for engagement with said gripping members, to support said inner vessel upon the flange of said outer vessel.

This specification signed and witnessed this 1st day of April, 1905.

HERMANN ELSNER

Witnesses:
LOUIS M. SANDERS,
FREDK. C. FISCHER.